US006842815B2

(12) United States Patent
Yim et al.

(10) Patent No.: US 6,842,815 B2
(45) Date of Patent: Jan. 11, 2005

(54) OUTPUT DRIVERS PREVENTING DEGRADATION OF CHANNEL BUS LINE IN A MEMORY MODULE EQUIPPED WITH SEMICONDUCTOR MEMORY DEVICES INCLUDING THE OUTPUT DRIVERS

(75) Inventors: Sung-min Yim, Kyungki-do (KR); Kyu-han Han, Kyungki-do (KR)

(73) Assignee: Samsung Electronics Co., LTD, Suwon (KR)

( * ) Notice: Subject to any disclaimer, the term of this patent is extended or adjusted under 35 U.S.C. 154(b) by 477 days.

(21) Appl. No.: 09/752,615

(22) Filed: Dec. 27, 2000

(65) Prior Publication Data

US 2001/0007115 A1 Jul. 5, 2001

(30) Foreign Application Priority Data

Dec. 29, 1999 (KR) ........................................ 1999-65073

(51) Int. Cl.[7] ............................................. G06F 13/14
(52) U.S. Cl. .............. 710/305; 365/189.02; 365/189.05
(58) Field of Search ................................ 710/305, 118, 710/74, 125; 711/104, 105; 326/30, 81, 83, 90, 86; 327/108, 112, 437, 594; 365/189.01, 230.06, 189.05, 189.02

(56) References Cited

U.S. PATENT DOCUMENTS

| | | | | | |
|---|---|---|---|---|---|
| 4,745,407 | A | * | 5/1988 | Costello ...................... 345/550 |
| 5,297,260 | A | * | 3/1994 | Kametani .................... 710/113 |
| 5,915,105 | A | * | 6/1999 | Farmwald et al. ........... 710/305 |
| 5,959,481 | A | * | 9/1999 | Donnelly et al. ............ 327/170 |
| 6,041,013 | A | * | 3/2000 | Kohno .................... 365/230.03 |
| 6,266,252 | B1 | * | 7/2001 | Karabatsos .................. 361/788 |
| 6,417,653 | B1 | * | 7/2002 | Massie et al. ............... 323/282 |
| 6,510,503 | B2 | * | 1/2003 | Gillingham et al. ......... 711/167 |
| 6,513,103 | B1 | * | 1/2003 | Garlepp et al. ............. 711/167 |
| 6,535,945 | B1 | * | 3/2003 | Tobin et al. ................ 710/305 |
| 6,550,013 | B1 | * | 4/2003 | Gervais et al. ............. 713/501 |

\* cited by examiner

*Primary Examiner*—Mark H. Rinehart
*Assistant Examiner*—Thomas J. Cleary
(74) *Attorney, Agent, or Firm*—Harness Dickey & Pierce, P.L.C.

(57) ABSTRACT

Output drivers in semiconductor memory devices such as Rambus DRAM prevent degradation of the signal characteristics of a channel bus line in a memory module equipped with the semiconductor memory devices. Each semiconductor memory device includes blocks of memory cells. The data of a memory cell in a block is transmitted to a data input/output line through an output driver for the block. The output driver includes a first transistor connected to a reference voltage (ground) and a second transistor. The first transistor is responsive to the data from the selected block. The second transistor selectively connects the first transistor to the data input/output line in response to a column cycle signal for selecting the block or a read control signal containing calibration information about the characteristics of the data input/output line. Data from the selected block is transmitted to the data input/output line via the first and second transistors when the second transistor responds to the column cycle signal. Accordingly, only the second transistor of the output driver to which a selectively activated channel enable signal is applied in the selected block is turned on, and the output drivers of the unselected data blocks do not increase the capacitance of the channel bus line, thereby allowing transmission of data over the channel bus line without degradation of signal characteristics of the channel bus line.

15 Claims, 4 Drawing Sheets

OUTPUT DRIVERS PREVENTING DEGRADATION OF CHANNEL BUS LINE IN A MEMORY MODULE EQUIPPED WITH SEMICONDUCTOR MEMORY DEVICES INCLUDING THE OUTPUT DRIVERS

BACKGROUND OF THE INVENTION

1. Field of the Invention

The present invention relates to semiconductor memory devices, and more particularly, to output drivers that prevent degradation of the performance of a channel bus line in a memory module when multiple semiconductor memory devices are connected to the channel bus line.

2. Description of the Related Art

The performance of a memory device generally depends on the input/output data rate, namely, the bandwidth of the memory device. The bandwidth can be increased by increasing the number of parallel input/output data bits or by increasing the access speed or rate. Extended data output dynamic random access memories (EDO DRAMs) and synchronous DRAMs (SDRAMs) are representative memory devices that include a large number of parallel input/output data bits to provide a high bandwidth. Rambus DRAMs (RDRAMs) are representative memory devices that use fast access operations to provide a high bandwidth. For an RDRAM, a data input/output rule such as x16 or x18 defines the number of data (DQ) pins and controls the amount of data simultaneously read from or written to the RDRAM. A typical RDRAM can output two bytes of data in 1.25 ns (i.e., at a rate 800 MHz) and outputs 16 bytes of data in eight cycles. Internally, the RDRAM performs an input/output operation on 128 (x128) or 144 (x144) bits of data at one time at a rate of 100 MHz. Therefore, the RDRAM demultiplexes or combines eight, 16-bit input data values into 128 internal bits of data by way of a serial-to-parallel prefetch during a write operation, and multiplexes 128 internal bits of data into 16-bit output data values by way of a parallel-to-serial prefetch during a read operation.

As shown in FIG. 1, a conventional Rambus module 5 includes a plurality of RDRAMs 11 through 14 sharing the channel bus lines. In particular, the DQ pins (DQA0 through DQA7 and DQB0 through DQB7 of FIG. 1) of each RDRAM connect to channel bus lines C_DQA0 through C_DQA7 and C_DQB0 through C_DQB7 of the Rambus module 5. In the Rambus module 5, a Rambus memory controller (RMC) 10 communicates with RDRAMs 11 through 14 via channel bus lines C_DQA0 through C_DQB7. To achieve a high bandwidth for the Rambus module 5, the channel bus lines C_DQA0 through C_DQB7 must have signal integrity characteristics that satisfy a type of input/output referred to as a Rambus signal level (RSL). To achieve the required RSL, output drivers in the RDRAMs 11 through 14 adjust the value $R_{OL}$ of an output resistance to maintain output current $I_{OL}$ in a proper range and must control or adjust the slew rate of output data according to changes in temperature.

FIG. 2 shows output drivers 21 through 24 of the RDRAMs 11 through 14, which are connected to one channel bus line C_DQA0.

Referring to FIG. 2, the output drivers 21 through 24 respond to output driver enable signals Vgate1 through VgateN and memory data DATA1 through DATAN from DQA0 blocks within the RDRAMs 11 through 14. The RMC 10 of FIG. 1 simultaneously activates the output driver enable signals Vgate1 through VgateN in response to control signals and device IDs. On the other hand, only one memory data (for example, DATA1) from a selected RDRAM (for example, 11) is activated among the memory data DATA1 through DATAN. Thus, when RDRAM 11 is selected, output driver 21 and the memory data DATA1 control the signal level on the channel bus line C_DQA0.

Transistors M11, M21, M31, ... MN1 turn on in response to activation of the output driver enable signals Vgate1 through VgateN, which are simultaneously activated for the output drivers 21, 22, 23, ... 24. The simultaneous activation of transistors M11 through MN1 increases the capacitance of the channel bus line C_DQA0. Transmission of data from the selected RDRAM requires charging or discharging of the increased capacitance of the channel bus line C_DQA0. Therefore, the voltage swings for the different data values on the channel bus line C_DQA0 decrease. Moreover, the input logic low/logic high voltage (VIL/VIH) characteristics, the input setup time/input hold time (tSS/tSH) characteristics or the temperature ($tQ_{MIN/MAX}$) characteristics of the channel bus line C_DQA0 are degraded when the number of RDRAMs sharing the channel bus line C_DQA0 increases.

Therefore, an output driver and a memory module are needed that can prevent degradation of a channel bus line even if the number of RDRAMs sharing the channel bus line increases.

SUMMARY OF THE INVENTION

Embodiments of the present invention can prevent degradation of the signal characteristics on a channel bus line, even when a large number of output drivers are connected to the channel bus line.

One embodiment of the present invention is an output driver in a semiconductor memory device having a plurality of blocks of memory cells. Each block transmits the data of a memory cell to a data input/output line through an output driver associated with the block. The output driver includes a first transistor and a second transistor. The first transistor is connected to a reference voltage (e.g., ground) and is responsive to the data from the memory cell in the associated block. The second transistor selectively connects the first transistor to the data input/output line in response to a column cycle signal for selecting the block or a read control signal containing calibration information about the characteristics of the data input/output line. The memory cell data of the selected block is transmitted to the data input/output line via the first and second transistors when the second transistor responds to the column cycle signal. Preferably, the second transistors of the output drivers in unselected blocks are off.

In accordance with another embodiment of the present invention, a memory module includes semiconductor memory devices having a plurality of blocks of memory cells. The blocks transmit data to input/output lines through corresponding output drivers. The memory module further includes channel bus lines shared by and connected to the data input/output lines of the semiconductor memory devices. When one of the blocks in a semiconductor memory device is selected, the selected block transmits data to the channel bus lines via the output driver of the selected block. Each of those output drivers is activated in response to a column cycle signal selecting the block. In the semiconductor memory devices, which include blocks sharing the channel bus line, the output drivers connected to the channel bus line are all deactivated. In the semiconductor memory devices of the memory module, each output driver includes a first transistor and a second transistor. The first transistor is connected to a reference voltage and is responsive to the memory cell data. The second transistor selectively connects the first transistor to the data input/output line in response to the column cycle signal or a read control signal containing calibration information about the characteristics of the data input/output line.

As described above, according to the present invention, an access operation only turns on the second transistor of the one output driver per channel bus line. Accordingly, the output drivers avoid increasing the capacitance of the channel bus line, thereby allowing transmission of data over the channel bus line without signal degradation on the channel bus line.

BRIEF DESCRIPTION OF THE DRAWINGS

The above aspects and advantages of the present invention will become more apparent by describing in detail a preferred embodiment thereof with reference to the attached drawings in which.

Use of the same reference symbols in different figures indicates similar or identical items.

DETAILED DESCRIPTION OF THE PRESENT INVENTION

The present invention relates to memory systems such as a Rambus dynamic random access memory (RDRAM). Particularly, the present invention relates to output drivers connected to channel bus lines shared by a plurality of RDRAMs in a Rambus module.

As noted above, FIG. 1 illustrates the architecture of a Rambus module 5 having a x16 input/output rule for a plurality of RDRAMs 11 through 14. One embodiment of the present invention is the Rambus module 5, wherein the RDRAMs 11 through 14 have output drivers in accordance with the invention as described further below.

Figure 1:
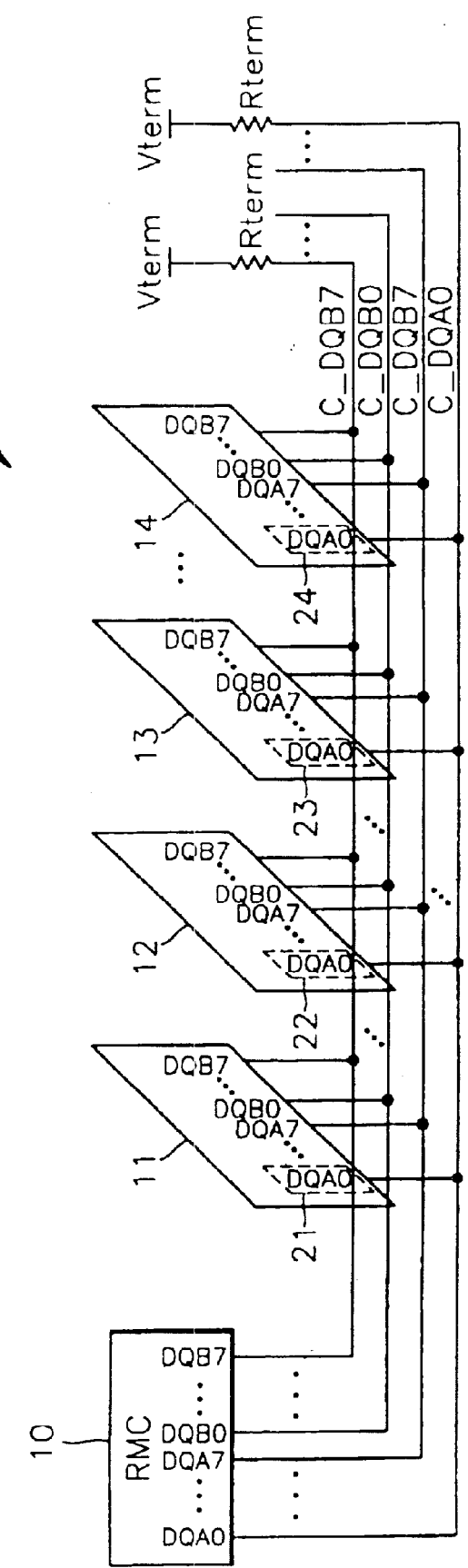
FIG. 1 is a diagram illustrating a Rambus module equipped with Rambus dynamic random access memories (RDRAMs) sharing channel bus lines.
Figure 3:
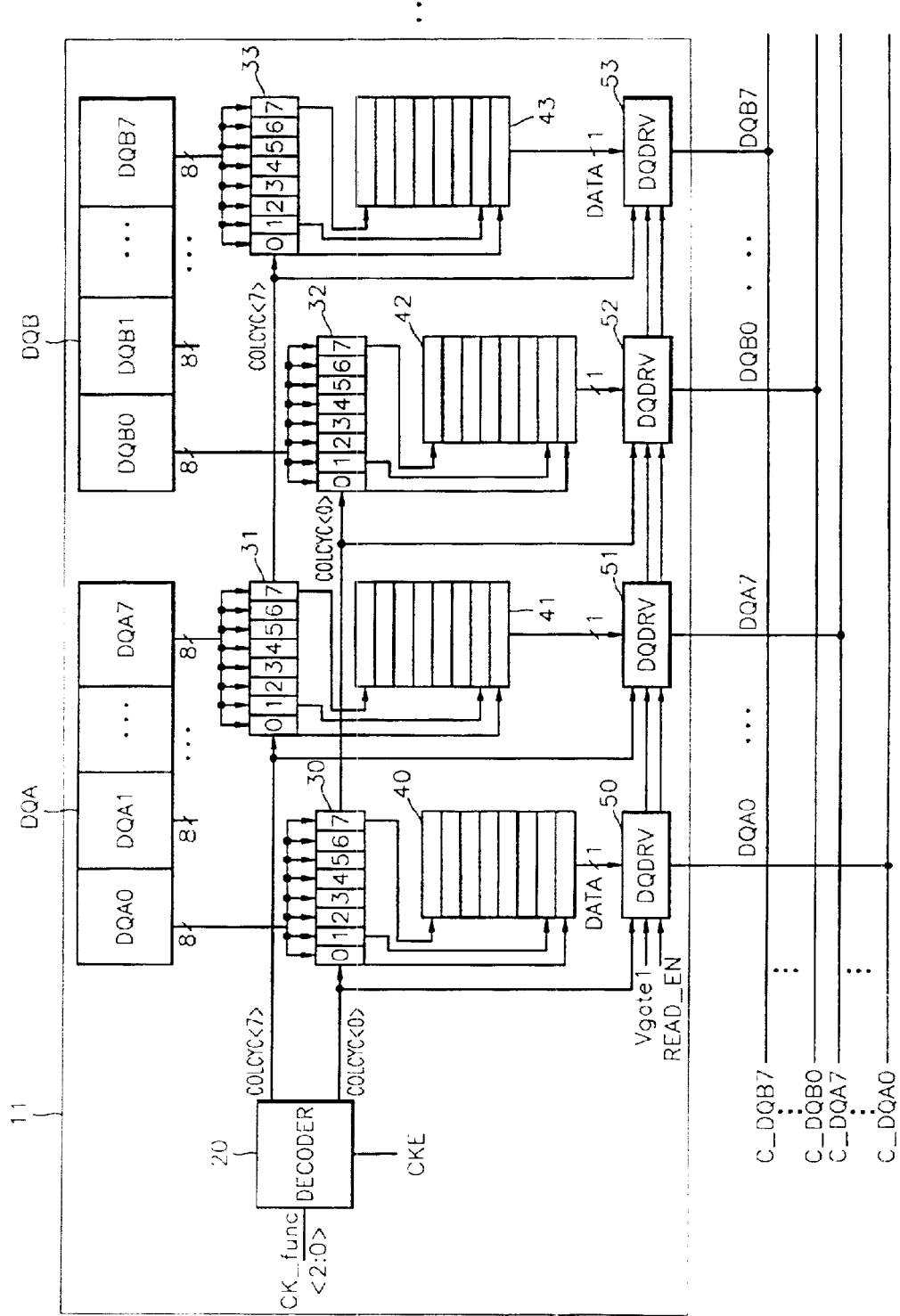
FIG. 3 is a schematic diagram illustrating blocks within a RDRAM of FIG. 1.

FIG. 3 schematically shows the internal blocks of one of the RDRAMs mounted on the Rambus module 5 of FIG. 1. In the illustrative embodiment described herein, the Rambus module 5 includes eight RDRAMs, but such Rambus modules could contain more or fewer than eight RDRAMs.

Each RDRAM generally includes a plurality of banks in a row direction, and a number of DQ blocks, which share a group of data lines in the column direction of the banks. The RDRAM 11 shown in FIG. 3 includes two DQ block groups DQA and DQB. Each of the DQ block groups DQA and DQB includes eight DQ blocks. That is, the DQ block groups DQA and DQB include DQ blocks DQA0 through DQA7 and DQB0 through DQB7, respectively. Eight data lines from each of the DQ blocks DQA0 through DQA7 and DQB0 through DQB7 are connected by way of pipelining via an interface logic block (not shown). The number of data lines provided from each of the DQ block groups DQA and DQB and the number of DQ blocks may vary depending on the memory architecture of the RDRAM.

The eight data lines from each of the DQ blocks DQA0 through DQB7 connected to respective data registers 30 through 33. For ease of illustration, FIG. 3 shows only four of the sixteen data registers associated with the DQ blocks DQA0 through DQA7 and DQB0 through DQB7. The data registers 30 through 33 store the data values from corresponding data lines in response to column cycle signals COLCYC<7:0>. A decoder 20, which combines a clock enable signal CKE and internal clock signals CK_func<2:0> generates column cycle signals COL-CYC<7:0>. The clock enable signal is from logic blocks (not shown) that transmit and read/write a device ID and a column operation packet, both of which are provided from the Rambus memory controller 10 of FIG. 1. Each of the eight column cycle signals COLCYC<7:0> corresponds to one block in the DQ block group DQA and one block in the DQ block group DQB. Accordingly, in response to one column cycle, for example, signal COLCYC<0>, data from the two DQ blocks DQA0 and DQB0 are stored in respective data registers 30 and 32.

Each of the sixteen data registers is connected to a respective one of sixteen pipelines. FIG. 3 shows only the pipelines 40, 41, 42, and 43, which are connected to respective data registers 30, 31, 32, and 33. After two data registers 30 and 32 received data in response to column cycle signal COLCYC<0>, the two data registers 30 and 32 transmit the data bits to pipelines 40 and 42. The pipelines 40 and 42 sequentially transmit data bits from each stage to the succeeding stage in a transmission operation in response to a clock signal (not shown). The pipelines 40 and 42 serially transmit the output data DATA to channel bus lines C_DQA0 and C_DQB0 through the output drivers 50 and 52, respectively. Accordingly, one RDRAM 11 outputs two data bits, one bit applied to each of the channel bus lines C_DQA0 and C_DQB0.

The remaining RDRAMs 12 through 14 of FIG. 1 perform similar output operations, for example, through output drivers 51 and 53 to drive data signals on the remaining channel bus lines. Two DQ blocks different from those of the RDRAM 11 are selected in each RDRAM 12 through 14 so that each RDRAM transmits data to a different pair of channel bus lines. Accordingly, the eight RDRAMs transmit to all sixteen bus lines C_DQA0 through C_DQA7 and C_DQB0 through C_DQB7. Therefore, the operation complies with the x16 data input/output regulation. Such operation is referred to herein as an interleave device mode.

Figure 4:
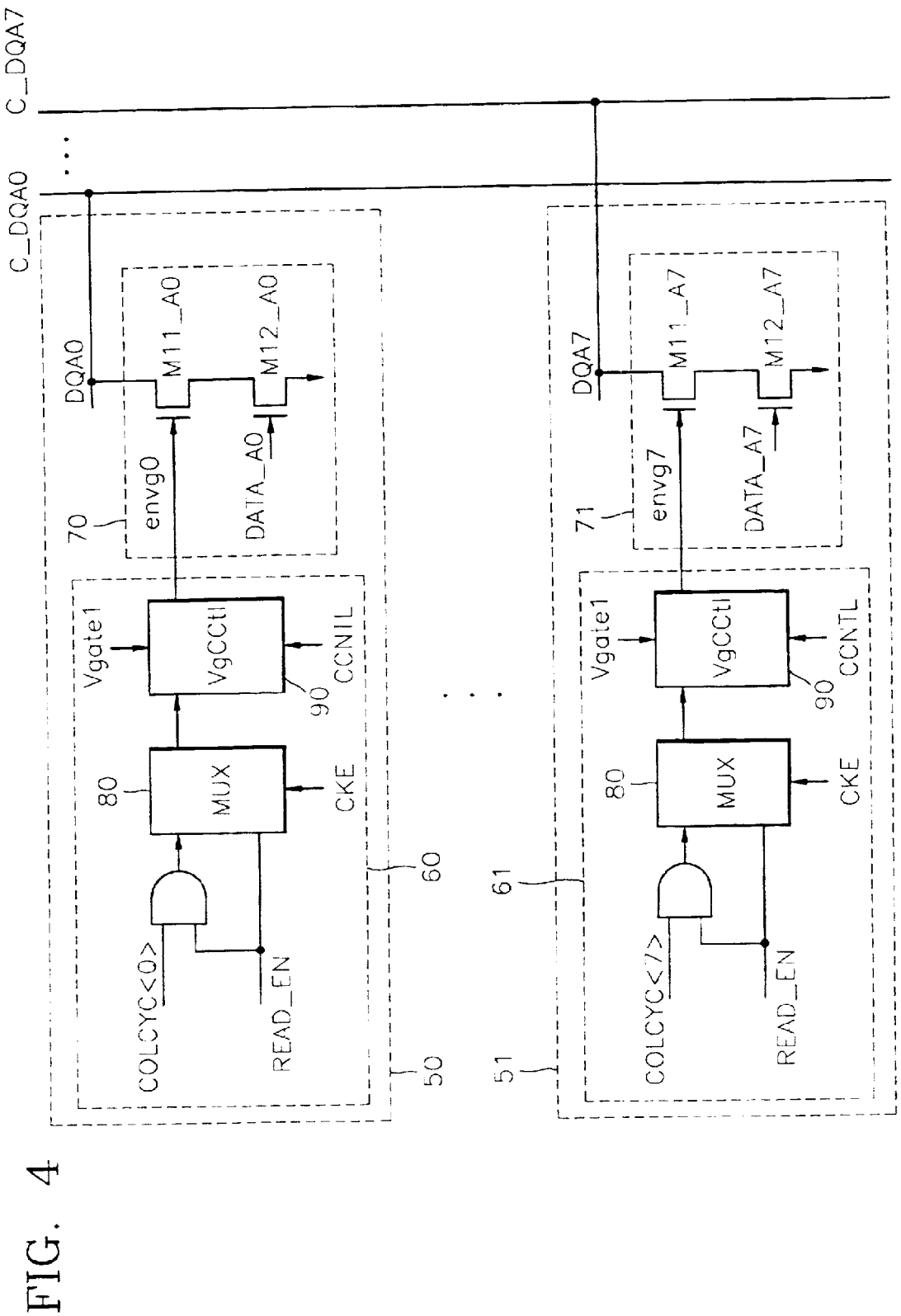
FIG. 4 is a detailed diagram illustrating an output driver according to an embodiment of the present invention.

The output drivers 50 and 51 of RDRAM 11 of FIG. 3 are shown in FIG. 4. As noted above, the output drivers 50 and 51 are connected to the blocks DQA0 and DQA7, respectively. Each output driver 50 or 51 includes a channel controller 60 or 61 and a final stage 70 or 71. The structure of each of the final stages 70 and 71 of the respective output drivers 50 and 51 is the same as the structure of the output driver 21 shown in FIG. 2. More specifically, data DATA_A0 of the block DQA0 and data DATA_A7 of the block DQA7 are applied to first transistors M12_A0 and M12_A7, respectively. Only the data, for example, DATA_A0, of one selected DQ block DQA0 among the DQA blocks is evaluated. This can be seen from the fact that data from the DQ blocks DQA0 through DQA7 are output through the associated data registers and pipelines in response to the column cycle signals COLCYC<7:0> as described with reference to FIG. 3.

The channel controllers 60 and 61 selectively generate the channel enable signals envg0 and envg7, respectively, in response to the output driver enable signal Vgate1, the column cycle signal COLCYC, a read adjustment signal READ_EN, the clock enable signal CKE and a current control signal CCNTL. The output driver enable signal Vgate1 is activated simultaneously in the RDRAMs 11 through 14 of FIG. 1 in response to the control signals and device ID from the Rambus memory controller 10 of FIG. 1 as in a conventional RDRAM. The read adjustment signal READ_EN contains calibration information for the output driver. In response to a calibration command, the calibration of an output driver adjusts the slew rate of the output driver according to the change in temperature. The current control signal CCNTL is for the calibration command which maintains output current $I_{OL}$ a proper range suitable for a Rambus signal level (RSL).

The channel controller 60 of the output driver 50 in the block DQA0 transmits the read adjustment signal READ_EN or a signal obtained from an AND operation on the column cycle signal COLCYC<0> and the read adjustment signal READ_EN as the channel enable signal envg0, in response to the clock enable signal CKE. More specifically, in response to the clock enable signal CKE, a multiplexer (MUX) 80 selects either the read adjustment signal READ_EN or the signal obtained from the AND operation on the column cycle signal COLCYC<0> and the read adjustment signal READ_EN. and MUX 80 transmits the selected signal to a calibration processor 90.

Calibration processor 90 controls the drive capabilities of the output driver 50 according to the value of the current control signal CCNTL. As noted above, control of the drive capabilities can compensate for changes in signal characteristics of the channel line, which caused, for example, by changes in temperature. Suitable current control circuitry is further described in U.S. Pat. No. 6,009,487, which is hereby incorporated by reference in its entirety.

When the signal obtained from the AND operation on the logic high level column cycle signal COLCYC<0> and the read adjustment signal READ_EN is selected in response to the logic high level clock enable signal CKE, the logic high level is transmitted to the calibration processor 90, and the calibration processor 90 activates the channel enable signal envg0. The calibration processor 90 applies channel enable signal envg0 to the second transistor M11_A0, thereby turning on the second transistor M11_A0. On the other hand, when the column cycle signal COLCYC<0> is activated, the column cycle signals COLCYC<7:1> are deactivated, and in all of the output drivers (including the output driver 51) in the DQA blocks except for in the block DQA0, the signals obtained from AND operations on the column cycle signals COLCYC<7:1> and the read adjustment signal READ_EN have a logic low level. Accordingly, even if activation of the clock enable signal CKE causes selection of the signals obtained from AND operations on respective column cycle signals COLCYC<7:1> and the read adjustment signal READ_EN, all the channel enable signals (including the signal envg7) except for the signal envg0 are deactivated to a logic low level, thereby turning off the second transistors including M11_A7 to which the channel enable signals are applied.

Accordingly, in the block group DQA, only the channel enable signal envg0 connected to the block DQA0 selected by the column cycle signal COLCYC<0> is activated, and the data DATA_A0 from the block DQA0, which controls first transistor M12_A0, is transmitted to the channel bus line C_DQA0 via the second transistor M11_A0. In the same manner, in the block group DQB, only the channel enable signal envg0 (not shown) for the block DQB0 of FIG. 3 selected by the column cycle signal COLCYC<0> is activated, and thus the data from the block DQB0 is transmitted to the channel bus line C_DQB0.

Similar operations in the remaining RDRAMs 12 through 14 of FIG. 1 activate only two transistors (M11) per RDRAM and only one transistor (M11) per channel bus line. In particular, in each RDRAM 12 through 14, a channel enable signal other than the signal envg0 is activated in response to one of the column cycle signals COLCYC<7:1> by which two DQ blocks different from those selected in the RDRAM 11 are selected. Consequently, the eight RDRAMs in the Rambus module transmit data to the 16 channel bus lines, complying with the x16 data input/output regulation.

Figure 2:
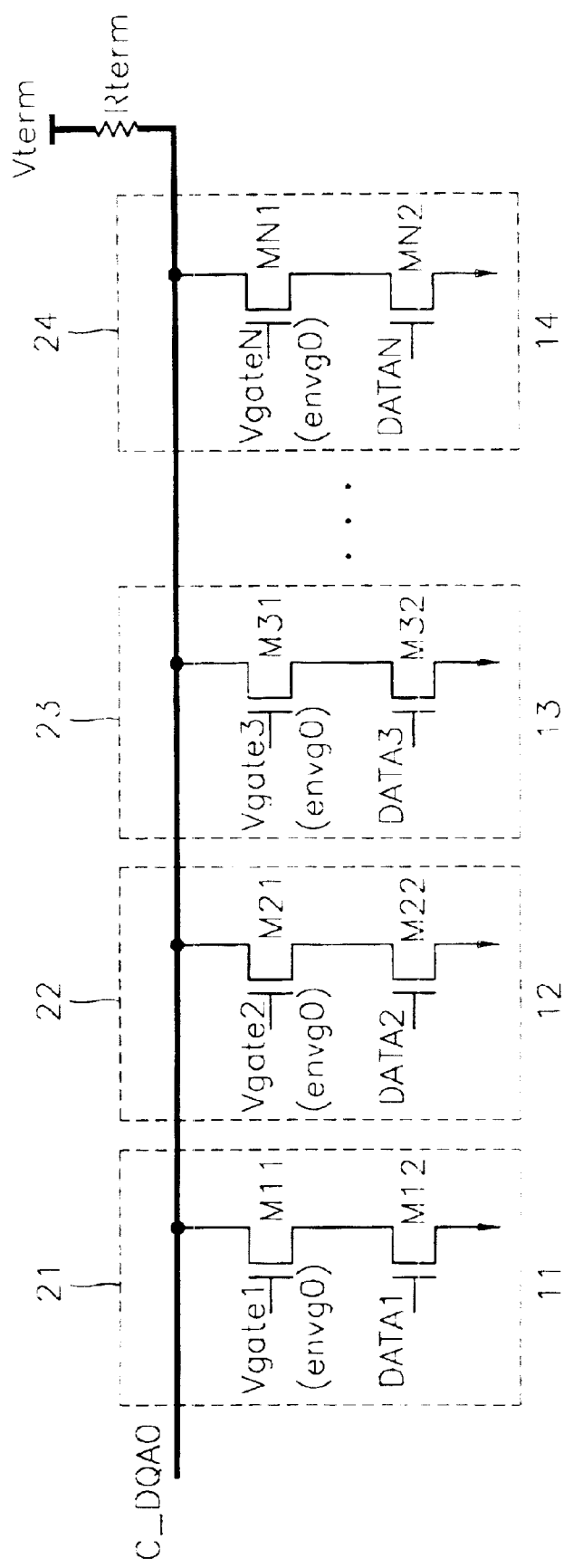
FIG. 2 is a diagram illustrating conventional output drivers in RDRAMs connected to a channel bus line.

For example, when the block DQA0 is selected in one of the RDRAMs, the channel enable signal envg0 is selectively activated among the signals envg0 through envg7 in that RDRAM, and that DRAM is connected to drive the channel bus line C_DQA0. In the above-described example, only the channel enable signal envg0 of the RDRAM 11 among the channel enable signals envg0 of the RDRAMs 11 through 14 in FIG. 2 is activated, and the only conductive transistor connected to the channel bus line C_DQA0 is within the RDRAM 11. The channel enable signals envg0 from the remaining RDRAMs 12 through 14 are deactivated, and transistors in RDRAMs 12 through 14 do not increase the capacitance on the channel bus line C_DQA0 in the same manner as in the conventional RDRAMs.

In the conventional RDRAM module, the output driver enable signals Vgate1, Vgate2, . . . and VgateN, which are simultaneously activated, turn on the second transistors M11, M21, M31 , . . . and MN1 resulting in an increase in capacitance, thereby degrading the characteristics of the channel bus line C_DQA0 as shown in FIG. 2. In the present invention, the channel enable signal envg0 in FIG. 2 is activated in only one RDRAM, for example, RDRAM 11 from among the RDRAMs 11 through 14 and turns on only the second transistor M11 to which it is applied. Consequently, the channel bus line C_DQA0 retains better signal transmission characteristics in the present invention.

When the MUX 80 selects the logic high level read adjustment signal READ_EN in response to the logic low level clock enable signal CKE, the channel enable signals envg0 through envg7 can all be activated to a logic high level. This structure is the same as a conventional one in which the output enable signals Vgate1 through VgateN are simultaneously activated. This means that the output driver of the present invention can also operate in the conventional manner.

Although the invention has been described with reference to a particular embodiment, it will be apparent to one of ordinary skill in the art that modifications of the described embodiment may be made without departing from the spirit and scope of the invention.

What is claimed is:

1. An output driver in a semiconductor memory device including a plurality of blocks of memory cells, wherein a first of the blocks transmits data to a data input/output line through the output driver, the output driver comprising:

a first transistor connected to a reference voltage, the first transistor being responsive to the data from the first block;

a second transistor between the first transistor and the data input/output line; and a controller including a multiplexer coupled to control the second transistor, the controller being operable in a first mode in which the second transistor is responsive to a read control signal and a column cycle signal for selecting the first block, wherein the data from the first block is transmitted to the data input/output line via the first and second transistors.

2. The output driver of claim 1, wherein the controller deactivates the second transistor when a second of the blocks is selected for data output.

3. The output driver of claim 1, wherein the controller activates the second transistor by sending a read control signal and when the second transistor responds to the read control signal, and the data from the first block is transmitted to the data input/output line via the first and second transistors.

4. The output driver of claim 1, wherein the control is further operable in a second mode in which the second transistor is responsive to a read control signal containing calibration information about characteristics of the data input/output line.

5. The output driver of claim 4, wherein the controller comprises the multiplexer that selectively transmits one of the column cycle signal and the read control signal to the gate of the second transistor in response to a clock enable signal.

6. The output driver of claim 4, wherein the characteristics of the data input/output line comprise an output current ($I_{OL}$) characteristic for adjusting a signal level of the data input/output line and a temperature characteristic (TMIN/MAX) for adjusting a slew rate of the output driver according to change in temperature.

7. A memory module comprising:
a plurality of semiconductor memory devices, each semiconductor memory device including a plurality of blocks of memory cells and a plurality of output drivers corresponding to the blocks, the blocks transmitting data through output drivers;
channel bus lines shared by data input/output lines, wherein:
in one semiconductor memory device, the data of a selected block is transmitted to one of the channel bus lines via a corresponding output driver, which is activated in response to a column cycle signal selecting the block, and via one of the data input/output lines, while in the remaining semiconductor memory devices sharing one of the channel bus lines, the output drivers are all deactivated, and wherein
each output driver comprises:
a first transistor connected to a reference voltage, the first transistor responsive to the memory cell data; and
a second transistor is connected to a controller including a multiplexer, the second transistor is configured to selectively connect the first transistor to the one of the data input/output lines in response to the column cycle signal or a read control signal containing calibration information about characteristics of the data input/output line.

8. The memory module of claim 7, wherein the second transistors of output drivers in the blocks are simultaneously activated when the second transistors respond to the read control signal, and the memory cell data of the selected block is transmitted to the one of the data input/output lines via the first and second transistors.

9. The memory module of claim 7, further comprising a multiplexer for selectively transmitting one of the column cycle signal and the read control signal to the gate of the second transistor in response to a clock enable signal.

10. The memory module of claim 7, wherein characteristics of the one of the data input/output lines are an output current ($I_{OL}$) characteristic of adjusting the signal level of the data input/output line and a temperature characteristic (TMIN/MAX) of adjusting the slew rate of the output driver according to change in temperature.

11. A semiconductor memory device comprising:
a plurality of output drivers; and
a plurality of blocks of memory cells corresponding to and respectively coupled to the plurality of output drivers, wherein each block transmits data to through the corresponding output driver, wherein
each output driver comprises:
a first transistor connected to a reference voltage, the first transistor being responsive to the data from the corresponding block;
a second transistor connected to the first transistor; and
a controller including a multiplexer connected to control the second transistor, the controller being operable in a first mode in which the second transistor is responsive to a read control signal and a column cycle signal for selecting the block corresponding to the output driver and operable in a second mode in which the second transistor is responsive to a read control signal, wherein the data from the corresponding block is transmitted to the data input/output line via the first and second transistors.

12. The semiconductor memory device of claim 11, wherein the controllers deactivate the second transistors of the output drivers in unselected blocks.

13. The semiconductor memory device of claim 11, wherein:
the controllers activate simultaneously the second transistors of output drivers during the second mode;
the controller signal separately activates the associated second transistor of the output driver during the first mode.

14. The semiconductor memory device of claim 11, each controller comprising a multiplexer that selectively transmits one of the column cycle signal and the read control signal to the gate of the second transistor in response to a clock enable signal.

15. The semiconductor memory device of claim 11, wherein characteristics of the one of the data input/output lines comprise an output current ($I_{OL}$) characteristic for adjusting a signal level of the data input/output line and a temperature characteristic (TMIN/MAX) for adjusting a slew rate of the output driver according to change a temperature.

* * * * *